US009798534B1

(12) United States Patent
Yi et al.

(10) Patent No.: US 9,798,534 B1
(45) Date of Patent: Oct. 24, 2017

(54) METHOD AND SYSTEM TO PERFORM NON-INTRUSIVE ONLINE DISK FIRMWARE UPGRADES

(71) Applicant: IP Holding Company LLC, Hopkinton, MA (US)

(72) Inventors: Zhengli Yi, Beijing (CN); Colin Zou, Beijing (CN); Joel Miller, Vacaville, CA (US); Chris Liu, Beijing (CN); Man Lv, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 70 days.

(21) Appl. No.: 14/789,659

(22) Filed: Jul. 1, 2015

(51) Int. Cl.
*G06F 11/00* (2006.01)
*G06F 9/445* (2006.01)
*G06F 11/07* (2006.01)
*G06F 11/20* (2006.01)

(52) U.S. Cl.
CPC .............. *G06F 8/65* (2013.01); *G06F 11/079* (2013.01); *G06F 11/0727* (2013.01); *G06F 11/0751* (2013.01); *G06F 11/0793* (2013.01); *G06F 11/2056* (2013.01); *G06F 2201/85* (2013.01)

(58) Field of Classification Search
CPC .............. G06F 11/0727; G06F 11/0751; G06F 11/0793; G06F 11/079; G06F 11/2056; G06F 8/65; G06F 2201/85

USPC ......................................................... 714/6.2
See application file for complete search history.

(56) References Cited

U.S. PATENT DOCUMENTS

| | | | |
|---|---|---|---|
| 6,799,284 B1 * | 9/2004 | Patel | G06F 11/1076 711/114 |
| 9,542,104 B2 * | 1/2017 | Green | G06F 3/0614 |
| 2003/0005354 A1 * | 1/2003 | Kalman | G06F 11/1088 714/6.22 |
| 2003/0163640 A1 * | 8/2003 | Pruett | G06F 3/0607 711/114 |
| 2005/0015579 A1 * | 1/2005 | Grover | G06F 11/0748 712/244 |
| 2011/0093675 A1 * | 4/2011 | Lu | G06F 11/1417 711/162 |
| 2017/0006006 A1 * | 1/2017 | Rawcliffe | H04L 63/08 |
| 2017/0006030 A1 * | 1/2017 | Krishnamoorthy | H04L 63/0884 |
| 2017/0006132 A1 * | 1/2017 | Sorenson, III | H04L 67/32 |
| 2017/0075781 A1 * | 3/2017 | Bennett, Jr. | G06F 3/0619 |

* cited by examiner

*Primary Examiner* — Yair Leibovich
(74) *Attorney, Agent, or Firm* — Staniford Tomita LLP (57) ABSTRACT

Embodiments are directed to a method of online storage device firmware upgrades by suspending input/output (I/O) operations to the storage device upon notification of a firmware upgrade to the storage device, maintaining a stripe log that contains data stripes updated by I/O operations issued to the storage device during suspension of the storage device, triggering the firmware upgrade to the storage device while the storage device is in suspension, reactivating the disk and new firmware upon completion of the firmware upgrade, and reconstructing the updated data stripes from the stripe log on the storage device after the reactivating step.

15 Claims, 8 Drawing Sheets

METHOD AND SYSTEM TO PERFORM NON-INTRUSIVE ONLINE DISK FIRMWARE UPGRADES

TECHNICAL FIELD

Embodiments are generally directed to data storage systems, and more specifically to performing upgrades to storage device firmware in a non-intrusive manner.

BACKGROUND

Enterprise-scale backup systems often involve many large arrays of storage devices, as well as different types of devices. Such devices are typically deployed under a maintenance scheme in which old devices are periodically updated or faulty devices are fixed or otherwise accommodated through system software. The update and maintenance of hard drives (HDDs) and solid state devices (SDDs) is typically performed by remotely updating, replacing, patching or otherwise modifying the firmware within each device or within a controller controlling one or more devices.

Firmware is typically stored in a non-volatile (NV) portion of a device, such as in a flash memory module or programmable logic circuit. Traditional firmware upgrade or replacement techniques involve re-flashing or re-burning the firmware on a device-by-device basis. Many large scale storage systems utilize hundreds or thousands of disks organized in RAID (redundant array of independent disks) arrays or other similar arrays. Such arrays contain disks that typically need to be upgraded at the same or nearly the same time. Clearly doing this one disk at a time can be a very labor-intensive process. More importantly, it can be very disruptive to customer processes as well since the upgrade requires that the individual storage devices be shutdown and perhaps even physically removed from the storage array. This type of upgrade procedure is referred to as an "offline" upgrade since the device to be upgraded is taken offline (powered down or idled) in order to perform the firmware change. Not only can the upgrade procedure affect many disks in a system, it can also cause a significant delay in backup operations since reconfiguration times can take anywhere from a few minutes to several hours to complete, and may be performed on a recurring schedule such as monthly, quarterly, and so on. Some hardware based RAID devices may provide a disk firmware upgrade feature that allows for online upgrades in which the device can remain powered up and in place in the system. However, there is presently in the storage device industry, there is no standard way to realize online disk firmware upgrades for software RAID systems.

What is needed, therefore, is a firmware update system and method that efficiently updates storage device firmware without requiring that the devices be taken out of service or shutdown for any appreciable amount of time.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup related processes executed in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
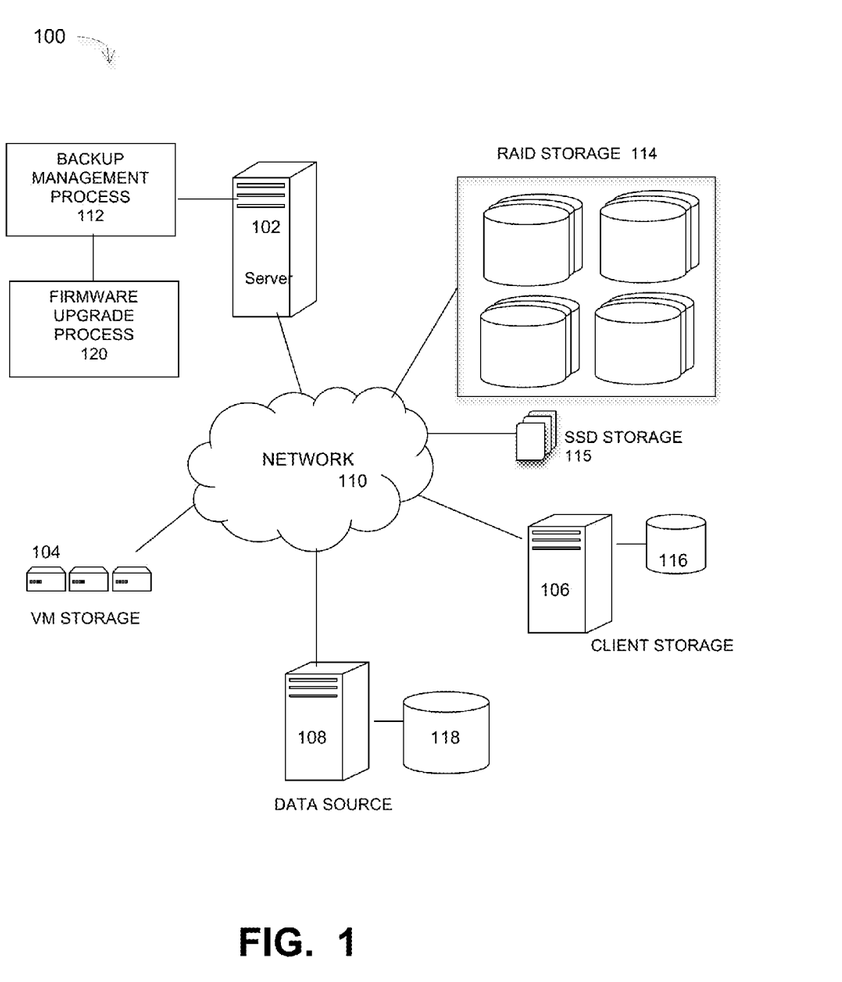
FIG. 1 illustrates a data storage system that implements one or more embodiments of an online firmware upgrade process, under some embodiments.

Embodiments are directed to a processing component in or associated with a backup server or memory controller that performs online disk firmware upgrades in a software RAID system in a manner that does not require shutdown or offline interaction with data storage devices. FIG. 1 illustrates a computer network system 100 that implements one or more embodiments of a large-scale network implementing a firmware upgrade process for uninterrupted operation, under some embodiments. The process allows for disk firmware upgrades without requiring interruption or stopping of customers' services. It also largely reduces the array reconstruction time causing by disk firmware upgrade by introducing stripe log in software RAID, and greatly shortens the whole disk firmware upgrade time by creating one thread for each RAID array.

As shown in system 100 of FIG. 1 a backup server 102 executes a backup management process 112 that coordinates or manages the backup of data from one or more data sources 108 to storage devices, such as HDD 114 or SSD 115 network storage, client storage 106, and/or virtual storage devices 104. With regard to virtual storage 114, any number of virtual machines (VMs) or groups of VMs may be provided to serve as backup targets, and the target VMs may also be organized into one or more vCenters (virtual centers) having many VMs each. The network storage devices serve as target storage devices for data backed up from one or more data sources, such as computer 108, which may have attached local storage 118 or utilize networked accessed storage devices 114, 115.

The data sourced by the data source may be any appropriate data, such as database data that is part of a database management system. In this case, the data may reside on one or more hard drives (e.g., 118) and may be stored in the database in a variety of formats. One example is an Extensible Markup Language (XML) database, which is a data persistence software system that allows data to be stored in XML format. Another example is a relational database management system (RDMS) that uses tables to store the information. Computer 108 may represent a database server that instantiates a program that interacts with the database.

A network server computer 102 is coupled directly or indirectly to the network storage devices 114, 115, client storage 116, data sources 108, and VMs 104 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, 115 which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In an embodiment, a one or more dedicated client storage machines 106 may be provided with access to local storage media 116 or an interface to the network storage devices. For the embodiment of FIG. 1, the network storage devices comprise both individual or arrays of hard disks (HDD) 114 or solid-state drives (SSD) 115. The SSD devices 115 may be embodied as flash drives or any other similar solid-state memory device.

For the embodiment of FIG. 1, network system 100 includes a server 102 that executes a data backup process with a functional component 120 that provides an uninterrupted firmware upgrade process. The backup management process 112 automates the backup of network data using the target storage devices. In an embodiment, the process 112 uses certain known full and incremental backup techniques along with a process or system component 120 to modify or replace storage system firmware in a timely and efficient manner and without requiring that devices be taken offline.

In an embodiment, system 100 may represent a Data Domain Restorer (DDR)-based de-duplication storage system, and storage server 128 may be implemented as a DDR De-duplication Storage server provided by EMC Corporation. However, other similar backup and storage systems are also possible. System 100 may utilize certain de-duplication processes, such as DD Boost (Data Domain Boost), which is a system that distributes parts of the de-duplication process to the backup server or application clients, enabling client-side de-duplication for faster, more efficient backup and recovery. A data storage deployment may use any combination of these interfaces simultaneously to store and access data.

As shown in FIG. 1, the backup system includes several different target storage devices, such as virtual machine VM storage 104, client storage 106/116 and storage arrays such as SSD storage 115 and disk array (RAID) storage 114. Embodiments can be configured to provide efficient firmware upgrades for any type of storage device, however they are primarily intended to be used with large-scale RAID arrays, such as storage 114. RAID arrays use disk striping to distribute and store data across multiple physical drives. Disk striping divides a body of data blocks and spreads them across multiple so that a stripe consists of the data divided across the set of hard disks or SSDs. Though disk striping provides higher performance it generally provides lower resiliency with respect to disk failures since a failure of one disk may impact the other striped disks. Different levels of RAID configurations have been developed to denote different levels of protection and performance. For example, RAID 0 stripes data without parity, and so is not fault tolerant. To address protect against data loss with RAID 0, a RAID set typically uses at least one stripe for parity where the parity information is commonly calculated by using an XOR function and stored on a physical drive in the RAID set. If a storage drive in the striped RAID set fails, the data is recoverable from the remaining drives and the parity stripe (though parity does add a small performance hit for small random writes). For a data set with n drives, the data might be striped on drives n through n−1, and the n-th drive would be reserved for parity. For example, in a RAID set with 10 drives, data could be striped to nine drives, and the 10th drive would be used for parity. RAID 4 and RAID 5 protect against a single drive failure, while RAID 6 uses two drives for parity and protects against two drive failures. Being highly fault tolerant, RAID 6 is often used for archiving applications, but is a more expensive and lower performing configurations than other RAID systems.

Moreover, even though a storage system uses RAID 6 protection, it can only handle maximum two disks failure per RAID array at the same time. If the disk firmware has bugs or defects, it will usually cause a group of disks to perform abnormally, which can result in downtime or even data loss. To address such issues, the only solution is to perform disk firmware upgrade as soon as possible. In addition, disk may need to update to latest firmware to get more features and better performance. Embodiments are intended to operate with any appropriate RAID condition including RAID 6, RAID 5, RAID 4, or any other similar configuration.

In general, a customer is responsible for storing data on the storage devices, e.g., RAID array 114, which have been purchased from or provided by a hardware vendor. The devices come loaded with an initial firmware version, and over the course of deployment firmware upgrades, bug fixes, configuration changes, and so on cause the initial firmware to become outdated. The hardware vendor makes firmware upgrades available in the form of software patches or similar routines that can be downloaded and burned into the devices. The vendor, or other service provider is thus responsible for upgrading the firmware for all their devices for a customer. Upgrades may be required to implement periodic improvements to a products, such as annual updates or to fix bugs or reported problems. Such problems may manifest as dropped or skewed data, logic problems that prevent disk scans, data corruption such as writes to the wrong location, total device failure, and any other problematic data storage error condition. In general a firmware upgrade or update involves the vendor providing a new firmware image (copy of the firmware program) that is programmed or burned into each device and that overwrites the initial or previous firmware image.

A RAID array 114 may typically include hundreds or thousands of disks in a large system. Present offline upgrade methods require customers to stop services and disk access in order to upgrade the disks' firmware, something which may be very inconvenient. Online disk firmware upgrades are preferred since system downtime is avoided, however, since customer data is stored on the disks, vendors must be careful when performing online disk firmware upgrades. If one disk fails to come up after disk firmware upgrade, the data on the disk is unavailable, and if more than two disks in one RAID array disappear after disk firmware upgrade, it may lead to service downtime or even data loss.

The striping process utilized by RAID storage can be implemented in either hardware or software. A hardware method uses firmware that resides entirely within a hardware RAID controller, while a software solution may be part of the operating system (OS). In an embodiment, the firmware upgrade process 120 is configured to work with software RAID implementations. The software RAID may be implemented as a layer that abstracts multiple devices, a generic logical volume manager, a component of the file system, a layer that sits above the file system and provides parity protection to user data, or any similar OS component.

Figure 2:
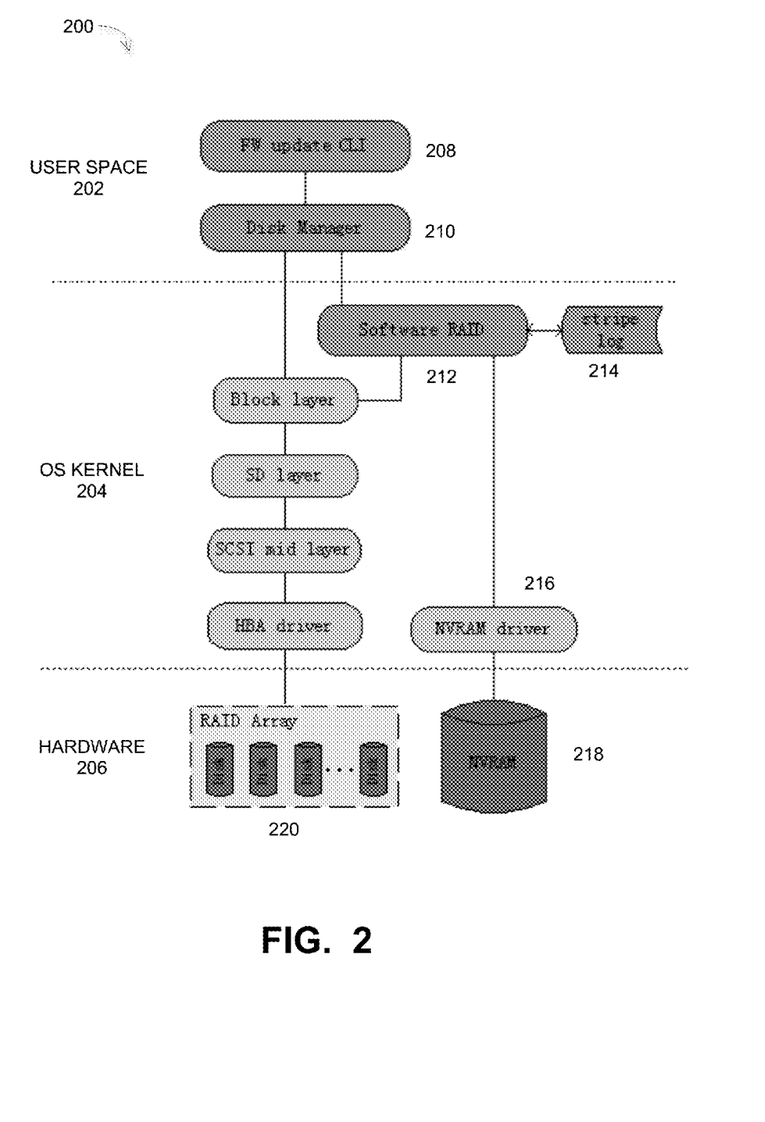
FIG. 2 illustrates the functional components of a firmware upgrade process for software RAID systems, under some embodiments.

FIG. 2 illustrates the functional components of a firmware upgrade process for software RAID systems, under some embodiments. As shown in diagram 200, there are three major sections comprising the user space 202, the OS kernel 204 and the hardware level 206. The user space 202 includes a firmware update command line interface or interpreter (CLI) 208, and a disk manager 210. The firmware update CLI is a user interface to invoke disk manager to perform an online disk firmware upgrade in response to a user command. Alternatively, the upgrade process can be triggered by an automated process and a periodic scheduler or event trigger. For the embodiment utilizing the CLI 208, there is at most one input, which is a command to start the upgrade process. If no array ID is specified, all disks in a RAID array or defined subset of a RAID array (such as defined by make/model, age, specifications, etc.) are upgraded at once. Otherwise, if a specific array ID is provided, the process upgrades only the disks in the array specified by the array ID. The hardware layer 206 contains the disk or disks of the RAID array 220 that are to be upgraded, as well as an NVRAM (non-volatile memory) storage 218 that is used to store certain data elements. The NVRAM 218 is typically a battery backed storage device that saves critical data such as the stripe log 214 and is controlled by a NVRAM driver 216, which in turn is controlled by the software RAID component 212.

The disk manager 210 controls the performance of the online disk firmware upgrade process. It can be configured to make the decision whether or not a disk needs to update its firmware. If so, it will interact with software RAID controller to suspend/resume the disk, perform the operations of updating disk firmware, and handle errors during the process. The disk manager defines and manages several states to track the disk firmware upgrade process. These state transitions are shown in diagram 300 of FIG. 3 and comprise a running state 302 in which the disk is operating normally as target storage, an upgrading state 306 in which the device is undergoing a firmware upgrade/update, a failed state 308 in the event an upgrade 306 fails, and a recovery state 304 that recovers the disk from a failed upgrade and returns the disk to the running state.

With reference to FIG. 1, the OS kernel 204 includes a software RAID component 212 and a stripe log 214 in addition to normal kernel processes such as the block, SD, and SCSI layers, and HBA driver. The software RAID component 212 is instrumental in implanting the online disk firmware upgrade process. It provides an interface to suspend disks to be upgraded one disk at a time from the RAID Array. For a suspended disk, the software RAID component will not send Read/Write I/O requests to the disk, and will not trigger reconstruction in the array. It also provides an interface to bring the suspended disk back to the RAID array so that the disk can accept Read/Write I/O requests. It also provides an interface to fail a disk, and start reconstructing the corresponding RAID array in the event of disk failure.

The stripe log 214 is a structure that records all stripes that are updated during the disk absence for a suspended disk, and is used to reconstruct the inconsistent stripes when the disk is brought back up. The software RAID can also be configured to save the stripe log to NVRAM to persist the data across system reboot.

Figure 4:
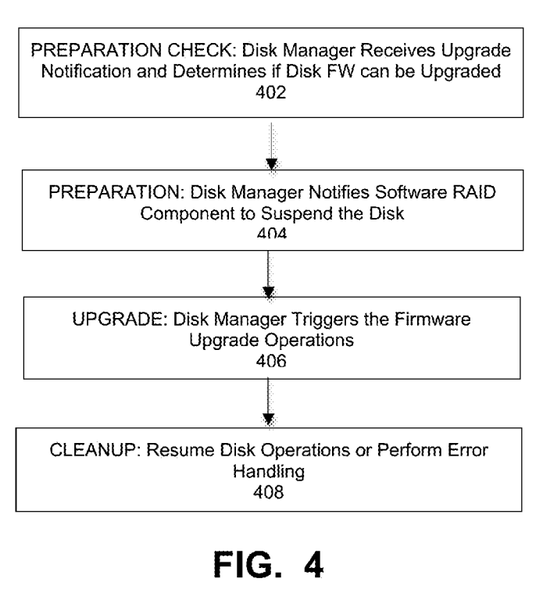
FIG. 4 is a flowchart that illustrates a method of performing online disk firmware upgrades under some embodiments.

The disk manager 210 is the controller of performing online disk firmware upgrade process. FIG. 4 is a flowchart that illustrates a method of performing online disk firmware upgrades under some embodiments. As shown in FIG. 4, the overall process can be divided into four steps. In step 402, a preparation check is performed in which the disk manager receives a notification regarding a firmware upgrade and determines if a specific disk's firmware can be upgraded or not. The notification can be a notice sent from a disk vendor indicating that a new firmware image is available or a bug fix is necessary to be patched, or other similar notification. In step 404 a preparation process is executed. Here, the disk manager 210 notifies the software RAID component 212 to suspend the disk to prevent Read/Write I/O requests to it and avoid reconstruction if any. The firmware is then upgraded in which the disk manager 210 triggers the firmware upgrade operations, as shown in step 406. After the firmware has been upgraded a cleanup operation is conducted which either resumes the disk or handles any errors that may have occurred during upgrade, step 408.

Figure 5:
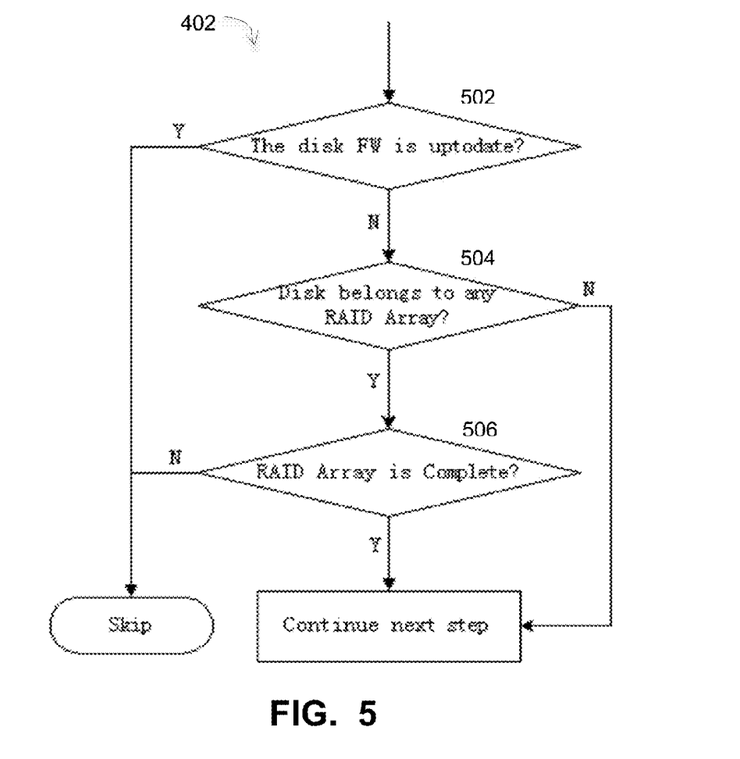
FIG. 5 is a flowchart that illustrates a method of performing a preparation check, under some embodiments.

With respect to the overall upgrade process, before starting to upgrade the disk firmware, the disk manager 210 needs to check if disk firmware upgrade can be performed, as shown in step 402 of FIG. 4. FIG. 5 is a flowchart that illustrates a method of performing a preparation check, under some embodiments. In general, a RAID array is a data protection domain. In order to lower the risk of disk firmware upgrades, the disk manager only upgrades the disks in a complete RAID array, thus no failed disk and no reconstruction is occurring in the RAID Array. Thus, as shown in FIG. 5, the process checks if the disk firmware is up to date, 502. If so the process ends, otherwise the process determines if the disk belongs to any RAID array 504 and if so, it determines whether that RAID array is complete, 506. If the RAID array is not complete the process ends, otherwise if the RAID array is complete, the process continues to the next step, which is typically the actual preparation step 404.

The disk that needs to upgrade firmware may belong to a RAID array, and is accepting IO requests from applications. When disk manager upgrades the disk firmware, the disk will be removed from the array and then come back. There will thus be some down time in which the software RAID may fail that disk and trigger reconstruction in accordance with a defined procedure. For purposes of the firmware upgrade, this kind of reconstruction is unnecessary and should be avoided. When the disk firmware upgrade is in progress, the disk manager will put the disk in a special state that is called the FW Upgrading state, and this state needs to be persistent across system reboot. For this case, the disk manager will save the disk in NVRAM.

Figure 6:
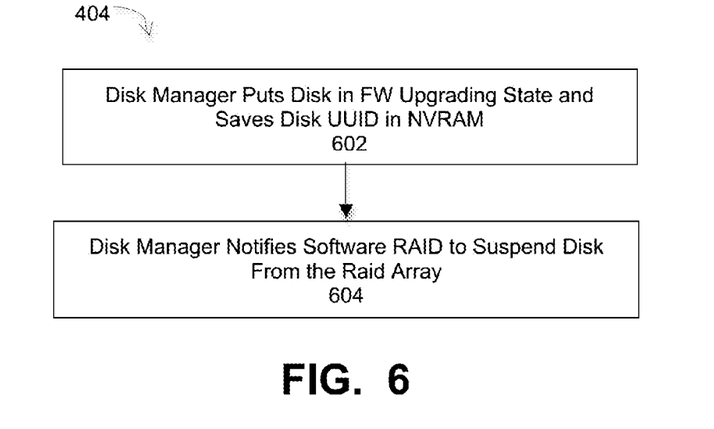
FIG. 6 is a flowchart that illustrates a method of preparing for a firmware upgrade, under some embodiments.

The preparation process 404 is illustrated in the flowchart of FIG. 6, under some embodiments. As shown in FIG. 6, the preparation step 404 includes two sub-steps: first, the disk manager puts the disk in FW upgrading state, and also saves the disk UUID (universally unique identifier) in the NVRAM to persist the disk state, 602; the disk manager then notifies the software RAID component to suspend the disk from the RAID Array. For an Unused disk, which is a disk that does not belong to any RAID Array, the disk manager only does step 602.

To suspend the disk from the RAID array, the software RAID component needs to avoid sending I/O requests to the disk, prevent reconstructing the full disk, log all stripes that are updated from the time the disk suspended, and reconstruct all stripes that were logged during the disks absence. As shown in FIG. 1, the software RAID component 212 maintains a stripe log 214 to record all stripes that have been changed since the disk was in suspension. When a disk is suspended from a RAID array, stripe logging is started for each associated array. In an embodiment, the stripe log 214 uses memory that is dynamically allocated at the time of the disk suspended, and comprises a bit map that represents one or multiple stripes per bit. When a stripe is updated, the corresponding bit is set. As disk capacity increases or stripe size vary increasing the number of stripes in the array, each bit will represent more than one stripe to keep memory requirements to a minimum. The stripe log is also saved to NVRAM 218 to prevent it getting lost if system reboots before the software RAID finishes reconstructing the inconsistent stripes on the disk. Thus, after system start up, the disk manager checks the NVRAM to see if any disk is in the middle of disk firmware upgrade. If so, the disk manager handles the error, which is described in greater detail below.

With regard to the firmware upgrade step 406, the disk manager 210 triggers the disk firmware commands to download the target firmware image to the disk, reactivate the disk new firmware, and also issue some read I/O requests to the disk to verify that the disk works well. The disk firmware commands vary depending on the disk types. For example, for ATA/SATA disks, the command may be DOWNLOAD MICROCODE; while for SCSI disks, the command may be WRITE BUFFER. When the disk manager starts to upgrade the disk firmware, it needs to setup a timer in case the disk fails and a timeout occurs. In this case, the disk manager can handle the errors and try to recover the disk.

Figure 3:
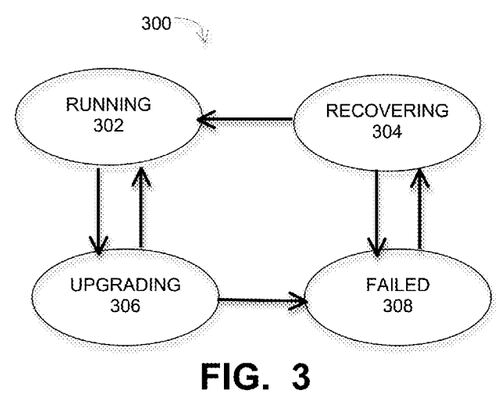
FIG. 3 illustrates states and state transitions of the firmware upgrade process under some embodiments.

With regard to the cleanup step 408, this operation could be either resuming the suspended disk if the firmware upgrade is successful, or error handling if any error happens or the timer timeout. Once the error happens, disk manager stops upgrading the other disks' firmware. If the firmware upgrade succeeds, the disk manager resumes the disk by first notifying the software RAID to bring the disk back to the RAID Array, and second, clearing the disk UUID in the NVRAM written at preparation stage to transit the disk state to the running state 302.

Because the I/O requests to the disk have been stopped in the preparation step 404, some stripes on the disk may be inconsistent. To bring the disk back to the RAID Array, the software RAID component makes use of the stripe log 214 and reconstructs all stripes that are updated during the disk absence. If the firmware upgrade fails or the timer timeouts, the disk manager changes the disk state to failed state 308, and will perform an error handling procedure.

With respect to error handling, errors in the firmware upgrade can generally happen in two ways: first during a system power down in which the system may be powered down or crash for any reasons during the disk firmware upgrade process, and second, a firmware update error in which the disk firmware update fails or the timer timeouts.

Figure 7:
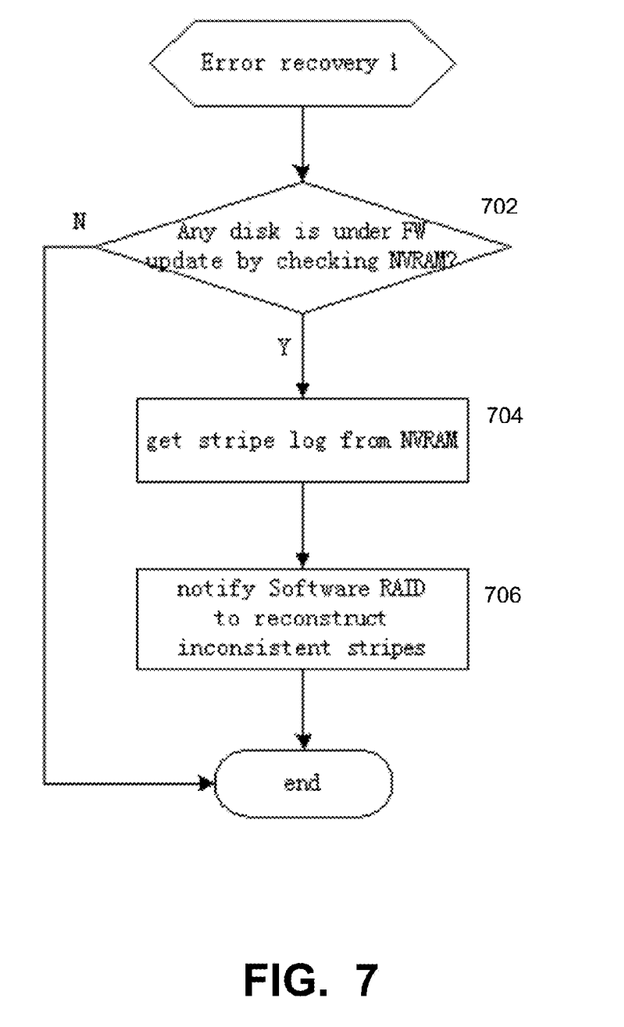
FIG. 7 illustrates a method of performing error recovery under a system power down condition, under some embodiments.

In a system power down condition, the disk is good but some stripes are inconsistent. The software RAID can read the stripe log in the NVRAM to know what these inconsistent stripes are, and then reconstruct them. FIG. 7 illustrates a method of performing error recovery under a system power down condition, under some embodiments. As shown in FIG. 7, if any disk is under a firmware upgrade procedure as determined in step 702, the process gets the stripe log from NVRAM, step 704. The software RAID component is then notified to reconstruct the inconsistent stripes, step 706.

Figure 8:
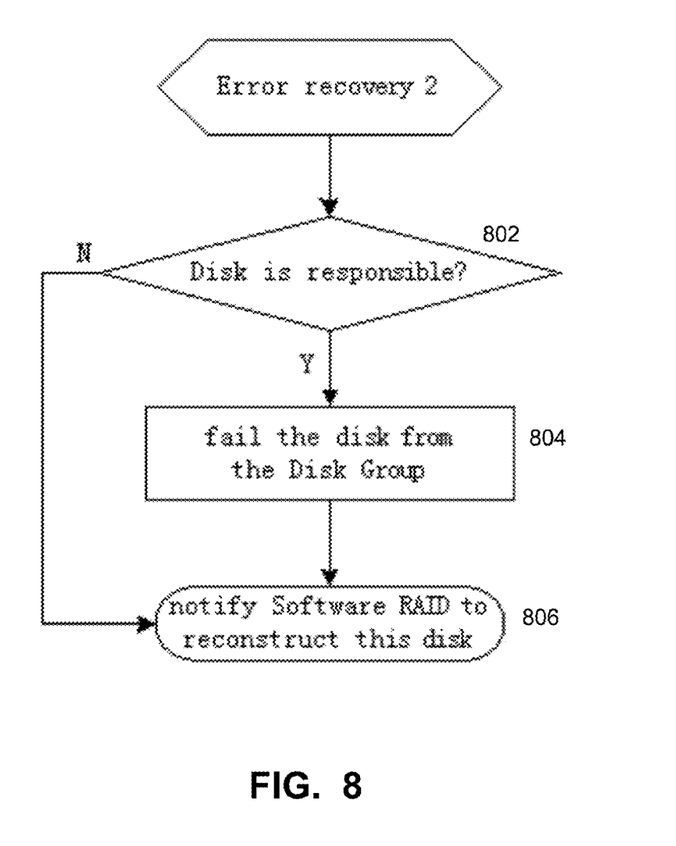
FIG. 8 is a flowchart that illustrates a recovery process using array reconstruction, under an embodiment.

If the error condition is due to a firmware update error and the disk cannot perform normally or never comes back. The disk manager can choose a solution selected according to the users' configuration. A first solution is to fail the disk and trigger array reconstruction. This solution will set the disk to failed state, and reminds the administrators to replace the disk. FIG. 8 is a flowchart that illustrates a recovery process for this solution, under an embodiment. As shown in FIG. 8, the process first determines if the disk is responsible for the error condition (as opposed to the system as in the power down condition), step 802. If so, the disk is failed from the disk group, 804, and notifies the software RAID component to reconstruct the disk, 806.

Figure 9:
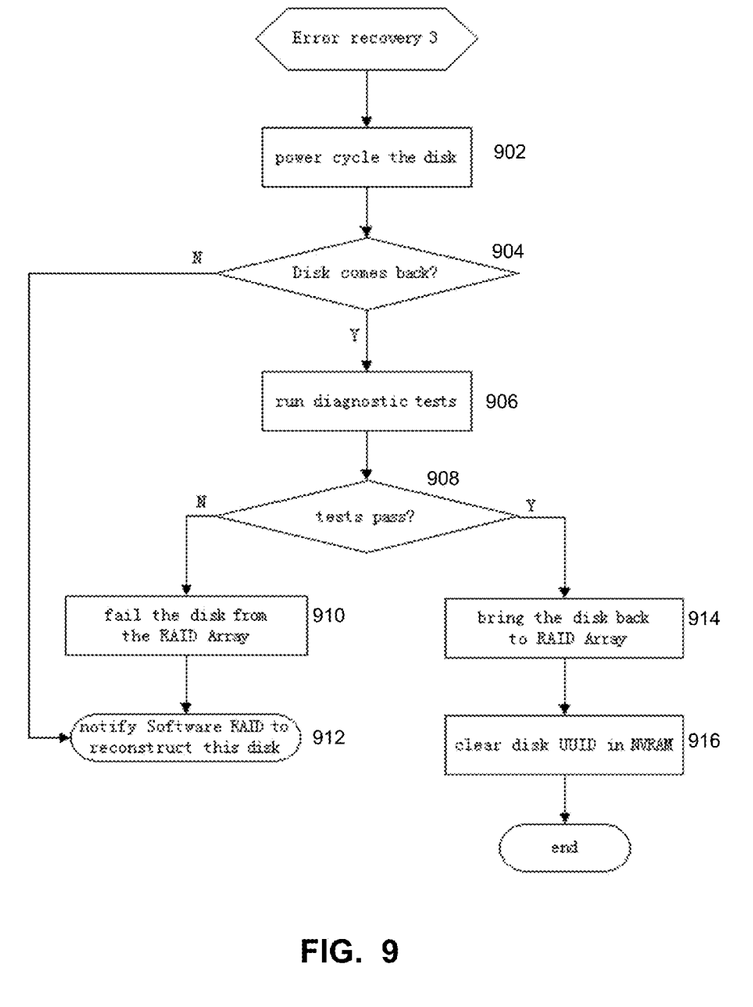
FIG. 9 is a flowchart that illustrates a recovery process using a recovery state, under an embodiment.

A second solution is to transit the disk state to the recovering state 304, try to recover the disk, and bring the disk back to the system if possible. FIG. 9 is a flowchart that illustrates a recovery process for this solution, under an embodiment. As shown in FIG. 9, the process first power cycles the disk, 902, and determines if the disk comes back, 904. If not, the system notifies the software RAID component to reconstruct the disk, step 912. If the disk does come back, diagnostic tests are run 906. If the disk does not pass the tests, it is failed from the RAID array, step 910, and the software RAID component is notified to reconstruct the disk, 912. If the disk passes the diagnostic tests, it is brought back to the RAID array, step 914. The disk UUID is then cleared from the NVRAM, step 916 and the process ends.

Figure 10:
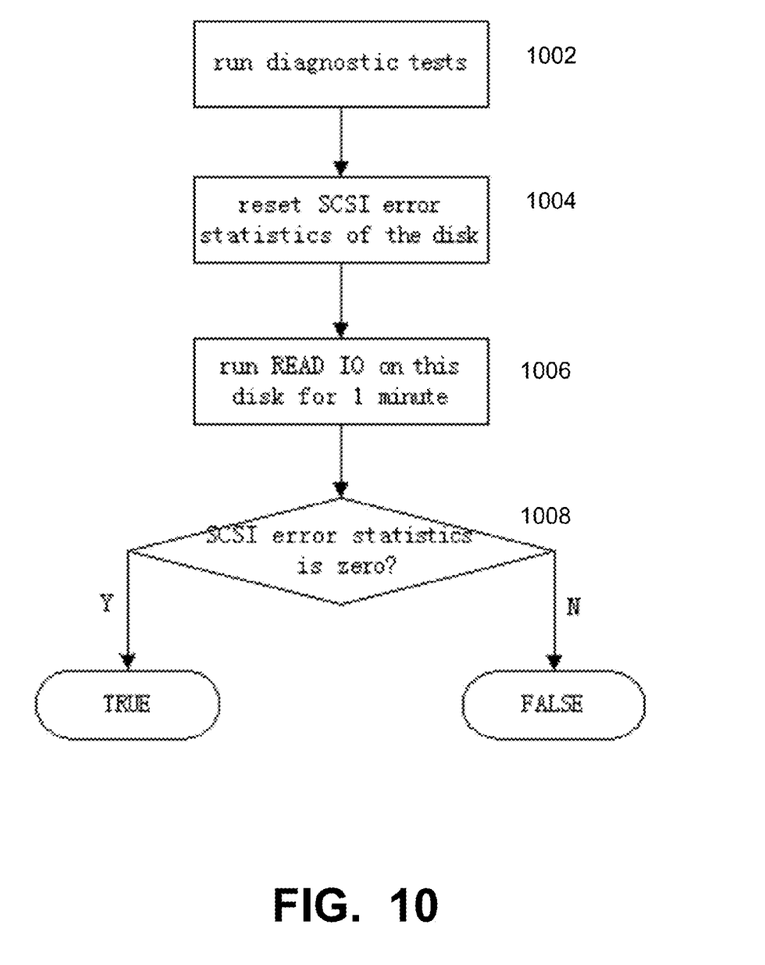
FIG. 10 is a flowchart illustrating a diagnostic test procedure, under some embodiments.

The diagnostic tests shown in step 906 comprise any appropriate diagnostic test for the RAID devices. FIG. 10 is a flowchart illustrating a diagnostic test procedure, under some embodiments. The system first runs the diagnostic tests 1002, and resets the SCSI error statistics of the disk, 1004. Read I/O operations are then performed on the disk for a certain amount of time, e.g., one minute or similar, 1006. It is then determined whether or not the SCSI error statistics are zero or have a value, 1008. If so, the error true flag is returned, otherwise an error false flag is returned. FIG. 10 illustrates a test procedure for a SCSI disk. Other tests can be used depending on the type of disk, such as ATA/SATA, and so on.

In an embodiment, to speed up the shelf disk firmware upgrade process, the disk manager can be configured to create one thread for each RAID Array to achieve both the efficiency and reliability goals. Once failing to upgrade a disk in one RAID array, the corresponding thread will exit and stop upgrading the rest of the disks in the RAID array, while the other RAID Arrays will not be affected.

Using the online disk firmware upgrade described herein, customers can upgrade all disks in their storage systems without stopping the services. The reconstruction time caused by disk firmware upgrade can be largely reduced by using the stripe log in the software RAID component. In addition, creating a single thread for each RAID Array can greatly shorten the entire disk firmware upgrade time.

The firmware upgrade process is non-intrusive because suspension of the disk from the array, upgrading the firmware, and reinstating the disk in the array, as well as any error correction that may need to be performed is all done as one or more background tasks. The firmware upgrade process does not require the user or customer to power down or otherwise deactivate the disk from the array, and no suspension of any backup operations need be done.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing online upgrading of storage device firmware, comprising:
   suspending input/output (I/O) operations to the storage device comprising a RAID array upon notification of a firmware upgrade to the storage device;
   maintaining, in a stripe log, data stripes updated by I/O operations issued to the storage device during suspension of the storage device;
   triggering the firmware upgrade to the storage device while the storage device is in suspension;
   reactivating the disk and new firmware upon completion of the firmware upgrade; and
   reconstructing the updated data stripes from the stripe log on the storage device after the reactivating step;
   removing the disk from the RAID array during the suspending step;

reinstating the disk to the RAID array after the firmware upgrade; and writing a universally unique identifier (UUID) assigned to the disk to the NVRAM upon triggering the firmware upgrade.

2. The method of claim 1 further comprising saving the stripe log to a battery-backed, non-volatile memory (NVRAM) location, and wherein the NVRAM location for the stripe log is dynamically allocated at the time of the suspending step.

3. The method of claim 1 wherein the stripe log comprises a bitmap having a plurality of bit locations, each containing a bit corresponding to a data stripe, and wherein a bit is set to a first logic state when a corresponding stripe is updated.

4. The method of claim 3 wherein the firmware upgrade comprises rewriting the firmware image in the disk in response to one of a firmware upgrade or a program code error.

5. The method of claim 4 further comprising:
starting a timer upon triggering the firmware upgrade;
checking for an error condition during the firmware upgrade, the error condition due to one of a system power down condition during the firmware upgrade, or a firmware upgrade failure condition.

6. The method of claim 5 wherein in the event of a system power down condition, the method comprises:
reading the stripe log from the NVRAM; and
reconstructing inconsistent stripes in the stripe log.

7. The method of claim 5 wherein in the event of a firmware upgrade failure condition, the method comprises:
failing the disk from a RAID disk group containing the disk; and
reconstructing the disk.

8. The method of claim 5 wherein in the event of a firmware upgrade failure condition, the method comprises:
power cycling the disk to determine whether or not it comes back, and if so running one or more diagnostic tests;
in the event of a test pass, bringing the disk back to the RAID array and clearing the disk UUID from the NVRAM; and
in the event of a test fail, failing the disk from the RAID array and reconstructing the disk.

9. The method of claim 4 wherein upon a successful firmware upgrade, the method further comprises:
bringing the disk back up in the RAID array;
clearing the UUID from the NVRAM; and
transiting the disk to a running state.

10. A system for upgrading firmware in a data storage device comprising a RAID array disk, comprising:
a first hardware component suspending input/output (I/O) operations to the storage device and removing the disk from the RAID array upon notification of a firmware upgrade to the storage device, and thereafter reinstating the disk to the RAID array;
a stripe log maintained by the first component and recording data stripes updated by I/O operations issued to the storage device during suspension of the storage device, wherein the first hardware component triggers the firmware upgrade to the storage device while the storage device is in suspension, reactivates the disk and new firmware upon completion of the firmware upgrade, and reconstructs the updated data stripes from the stripe log on the storage device after the reactivation of the disk;
a battery-backed, non-volatile memory (NVRAM) storing the strip log, and wherein the NVRAM location for the stripe log is dynamically allocated at the time of the suspension triggering, and further wherein the stripe log comprises a bitmap having a plurality of bit locations, each containing a bit corresponding to a data stripe, and wherein a bit is set to a first logic state when a corresponding stripe is updated;
a universally unique identifier (UUID) assigned to the disk and written to the NVRAM upon triggering of the firmware upgrade;
a timer started upon the triggering of the firmware upgrade; and
an error checking component checking for an error condition during the firmware upgrade, the error condition due to one of a system power down condition during the firmware upgrade, or a firmware upgrade failure condition.

11. The system of claim 10 wherein the firmware upgrade comprises rewriting the firmware image in the disk in response to one of a firmware upgrade or a program code error.

12. The system of claim 11 wherein in the event of a system power down condition, first component reads the stripe log from the NVRAM and reconstructs inconsistent stripes in the stripe log; and in the event of a firmware upgrade failure condition, the first component fails the disk from a RAID disk group containing the disk, and reconstructs the disk.

13. The system of claim 11 wherein in the event of a firmware upgrade failure condition, the first component power cycles the disk to determine whether or not it comes back, and if so runs one or more diagnostic tests; and in the event of a test pass, brings the disk back to the RAID array and clearing the disk UUID from the NVRAM; and in the event of a test fail, fails the disk from the RAID array and reconstructs the disk.

14. The system of claim 10 wherein upon a successful firmware upgrade, the first component brings the disk back up in the RAID array, clears the UUID from the NVRAM, and transits the disk to a running state.

15. A computer program product, comprising a non-transitory computer-readable medium having a computer-readable program code embodied therein, the computer-readable program code adapted to be executed by one or more processors to perform online upgrading of storage device firmware, comprising:
suspending input/output (I/O) operations to the storage device comprising a RAID array upon notification of a firmware upgrade to the storage device;
maintaining, in a stripe log, data stripes updated by I/O operations issued to the storage device during suspension of the storage device;
triggering the firmware upgrade to the storage device while the storage device is in suspension;
reactivating the disk and new firmware upon completion of the firmware upgrade; and
reconstructing the updated data stripes from the stripe log on the storage device after the reactivating step;
removing the disk from the RAID array during the suspending step;
reinstating the disk to the RAID array after the firmware upgrade; and
writing a universally unique identifier (UUID) assigned to the disk to the NVRAM upon triggering the firmware upgrade.

* * * * *